US008875260B2

(12) United States Patent
Zmener

(10) Patent No.: US 8,875,260 B2
(45) Date of Patent: Oct. 28, 2014

(54) SERIALIZED AUTHENTICATION AND AUTHORIZATION SERVICES

(71) Applicant: International Business Machines Corporation, Armonk, NY (US)

(72) Inventor: Sebastian Matias Zmener, Buenos Aires (AR)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 13/965,374

(22) Filed: Aug. 13, 2013

(65) Prior Publication Data

US 2013/0332998 A1 Dec. 12, 2013

Related U.S. Application Data

(63) Continuation of application No. 13/006,258, filed on Jan. 13, 2011, now abandoned.

(51) Int. Cl.
*H04L 29/06* (2006.01)
*G06F 21/00* (2013.01)

(52) U.S. Cl.
CPC .............. *H04L 63/083* (2013.01); *H04L 63/20* (2013.01); *H04L 63/101* (2013.01); *H04L 63/0892* (2013.01)
USPC .................................. 726/5; 726/27; 713/168

(58) Field of Classification Search
CPC ..... H04L 63/20; H04L 63/083; H04L 63/101; H04L 63/0892; H04L 63/10; H04L 63/08; G06F 21/31; G06F 21/30
See application file for complete search history.

(56) References Cited

U.S. PATENT DOCUMENTS

| 6,219,790 | B1 | 4/2001 | Lloyd et al. |
| 6,959,336 | B2 | 10/2005 | Moreh et al. |
| 7,631,347 | B2 | 12/2009 | Cam-Winget et al. |
| 2006/0123469 | A1 | 6/2006 | Lee et al. |
| 2006/0236383 | A1 | 10/2006 | Cam-Winset et al. |
| 2008/0109898 | A1 | 5/2008 | Mohammed et al. |
| 2009/0204810 | A1 | 8/2009 | Benanter et al. |

FOREIGN PATENT DOCUMENTS

WO WO2007055828 5/2007

OTHER PUBLICATIONS http://scg.unibe.ch/archive/projects/Haer06a.pdf Entitled: "JPAAM—Pluggable Authentication and Authorization Framework".
http://ieeexplore.ieee.org/search/freesrchabstract.jsp?tp=&arnumber=1259262&queryText%3D%28aaa%29%26openedRefinements%3D* Entitled: "A Novel Service-Oriented AAA Architecture".
Notice of Informal Application (Mail date Mar. 16, 2011) for U.S. Appl. No. 13/006,258, filed Jan. 13, 2011; Confirmation No. 4142.
Mar. 24, 2011 Filed Resp. to Notice of Inf. Appl.(Mail date Mar. 16, 2011), for U.S. Appl. No. 13/006,258, filed Jan. 13, 2011; Conf. No. 4142.

(Continued)

*Primary Examiner* — Izunna Okeke
(74) *Attorney, Agent, or Firm* — John A. Jordan

(57) ABSTRACT

Requests for User Services on networked computers running on different platforms with different Authentication, Authorization and Auditing (AAA) Security Systems are processed through an AAA Services Manager Server and Web Services Servers. The AAA Services Manager Server communicates requests for User Services to Web Services Servers using corresponding URL Web addresses. Web Services correspond to their respective Authentication Security Systems and Authorization Security Systems through which User Services may be obtained. The Web Services Servers act to access, for User validation, the respective Authentication Security Systems and Authorization Security Systems according to their individual languages and computing platform requirements.

17 Claims, 6 Drawing Sheets

(56) References Cited

OTHER PUBLICATIONS

Office Action (Mail date Feb. 13, 2013) for U.S. Appl. No. 13/006,258, filed Jan. 13, 2011; Conf. No. 4142.

Apr. 25, 2013 Filed Response to Office Action (Mail date Feb. 13, 2013) for U.S. Appl. No. 13/006,258, filed Jan. 13, 2011; Conf. No. 4142.

Notice of Allowance and Fee(s) Due (Mail date Jul. 17, 2013), for U.S. Appl. No. 13/006,258, filed Jan. 13, 2011; Conf. No. 4142.

SERIALIZED AUTHENTICATION AND AUTHORIZATION SERVICES

The present application is a continuation application of a co-pending U.S. patent application Ser. No. 13/006,258, filed Jan. 13, 2011 and allowed Jul. 17, 2013.

BACKGROUND OF THE INVENTION

1. Field of the Invention

The present invention relates generally to secure use of computer and network systems and, more particularly, to managing authentication, authorization and auditing in such systems.

2. Background and Related Art

Processes known as Authentication, Authorization, and Auditing (AAA) are commonly used to protect computer and network systems from unauthorized access. Organizations spend significant amounts of time and money to protect their organization's information and data from unauthorized use. On the other hand, there are valid reasons for sharing information within and among organizations and diverse users of such information. Thus, there is competing interest for organizations to share information among employees and with their partners, customers, suppliers and possibly competitors, for example, on the one hand, and yet keep such information secure from unauthorized access, on the other.

One common authentication system relies upon the use of a user ID and password process. One of the difficulties with such an approach is that often each system to be accessed requires its own user ID and password thus necessitating the remembering of multiple user IDs and passwords. As more user systems become available for use, such requirement becomes more cumbersome. Another difficulty is that each new system that holds user IDs and password need to be managed by people in most cases, and this leads to more problems while the administration grows.

Although it is known to centralize user systems and databases to facilitate easier access and administration, such an approach is not practical for access to all applications and databases, and particularly for access to applications and databases, for example, in development. This is particularly true where the applications are on different domains or applications in development process or testing phases. Centralized access is particularly difficult to employ where Applications must validate access with databases and networks that are accessible on different User AAA Systems employing different operating systems and network arrangements where each may employ its own application programming, language and its own authentication and authorization access protocol.

The lack of a system to handle disparate access requirements and protocols results in use of a multiplicity of User IDs and passwords for the various systems, and often requires administrative intervention to reset passwords, issue temporary passwords and the like.

SUMMARY OF THE PRESENT INVENTION

In accordance with an embodiment of the invention there is provided a method of authenticating and authorizing access to Applications on different user Systems in networked server computers arrangements. The method includes providing a username, password and an Application name. A predefined authentication list of the user authentication Services in the order in which they are to be called for authentication, and an authorization list of user authorization Services related to the application in the order in which they will be called for authorization are provided. An authentication Web address list of the Web addresses corresponding to each user authentication Service on the authentication list in the same order as the authentication list and an authorization Web address list of the Web addresses corresponding to each of the user authorization Services on the authorization list are created. The method further includes sequentially sending the username and password to each of the Web addresses on the authentication Web address list in the order in which they are listed until a username and password are accepted by an authentication System, the authentication list is completed or the User is recognized but found locked, its password is invalid, expired or otherwise ineligible for present authentication. When a password is accepted for access by an authentication System, the method acts to sequentially send the username and Application name to each of the Web addresses on the authorization Web address list in the order in which they are listed until the username and Application name are accepted for access by an authorization System, access is denied or invalid, in other status that differs from an actual granting access (e.g. pending approval or expired) or the authorization list is completed.

In accordance with another embodiment of the invention, wherein when the username and password are communicated to the Web addresses of the authentication Services and the username and Application name are communicated to the Web addresses of the authorization Services, the authentication Services and authorization Services act with the programming language that better suits to interfacing with the respective authentication Security Systems and authorization Security Systems.

In accordance with a further embodiment of the invention, there may be a variation of the above methods, wherein the authentication list and the authorization list are created by user input terminals and the authentication Web address list and authorization Web address list are created at an authentication and authorization Services Manager from the authentication list and authorization list, as received from the input terminals. In yet another embodiment of the invention, the authentication list and authorization list are created by the authentication and authorization Services Manager server.

In accordance with an another embodiment of the invention, a system for authenticating and authorizing access to different user Applications on networked server computers is provided. The system includes client devices for initiating access to an Application on networked server computers hosting a plurality of available user Applications, through validation with different user authentication Services and different user authorization Services, by using an Application name, username and password. Web authentication and authorization Services corresponding to different user authentication Systems and different user authorization Systems and with the Web authentication and authorization Services arranged to initiate access, when called, interface with the different user authentication Systems and different user authorization Systems according to the respective programming language employed by each of the user authentication Systems and user authorization Systems in response to a request for user access. An authentication and authorization Services Manager server is arranged to process a username, password, Application name and predefined authentication list of authentication Services and a predefined authorization list of authorization Services for user access to the networked server computers and translate the authentication list of authentication Services and the authorization list of authorization Services into a corresponding authentication Web address list and a corresponding authorization Web address list in the same order as the authentication list and authorization list with each list providing the sequential order in which the list entries will be called, initially calling from the authentication Web address list for authentication with the username and password, and in response to receipt of return messages from user authentication Services, as called from the authorization list for authorization with username and Application name. In response to a call for authorization from said authorization list, the authorization Service returns a message indicating the level of authorization, as provided by its corresponding authorization Security System.

In yet another embodiment of the invention, the client devices provide the predefined list of authentication Services and the predefined list of authorization Services with each list arranged in a sequence in which they are to be called by the Web authentication and authorization Services Manager. In still yet another embodiment, authentication and authorization Services Manager responds to an Application name to create the predefined authentication list and predefined authorization list, with each list arranged in the sequence in which the entries are to be called.

In a further embodiment of the invention, computer program product for authenticating and authorizing access to Applications in different user systems on networked server computers is provided on a computer usable medium having computer usable program code embodied therewith. The computer usable program code includes computer usable program code configured to process username, password, an Application name and a list with the names of authentication Services and a list with the names of authorization Services. Computer usable program code is also configured to create an authentication Web address list of the Web addresses corresponding to each user authentication Service on the authentication list in the same order as the authentication list. Further computer usable program code is configured to create an authorization Web address list of the Web addresses corresponding to each of the user authorization Services on the authorization list. Computer usable program code is configured to sequentially send the username and password to each of the Web addresses on said authentication Web address list in the order in which they are listed until a username and password are accepted by an authentication System, the authentication list is completed or the User password is recognized but found invalid, expired, locked or otherwise ineligible for present authentication. Further computer usable program code is configured so that when a password is accepted by an authentication System, the program code acts to sequentially send the username and application name to each of the Web addresses on the authorization Web address list in the order in which they are listed until the username and Application name are accepted by an authorization System, the authorization list is completed or the username and Application name are matched but access is denied or invalid, or has a status that differs from an actual granted access.

In a further embodiment of the invention, computer usable program code is configured so as to communicate the username and Application name to the Web addresses corresponding to the authentication Services on the authentication list and the Web addresses corresponding to the authorization Services on the authorization list to initiate interfacing with the programming language used by the respective authentication Systems and authorization Systems. In yet a further embodiment of the invention, computer readable program code is configured to receive the authentication list and the authorization list, created by user input terminals, and create the authentication Web address list and the authorization Web address list from the received authentication list and authorization list.

DETAILED DESCRIPTION OF THE DRAWINGS

Figure 1:
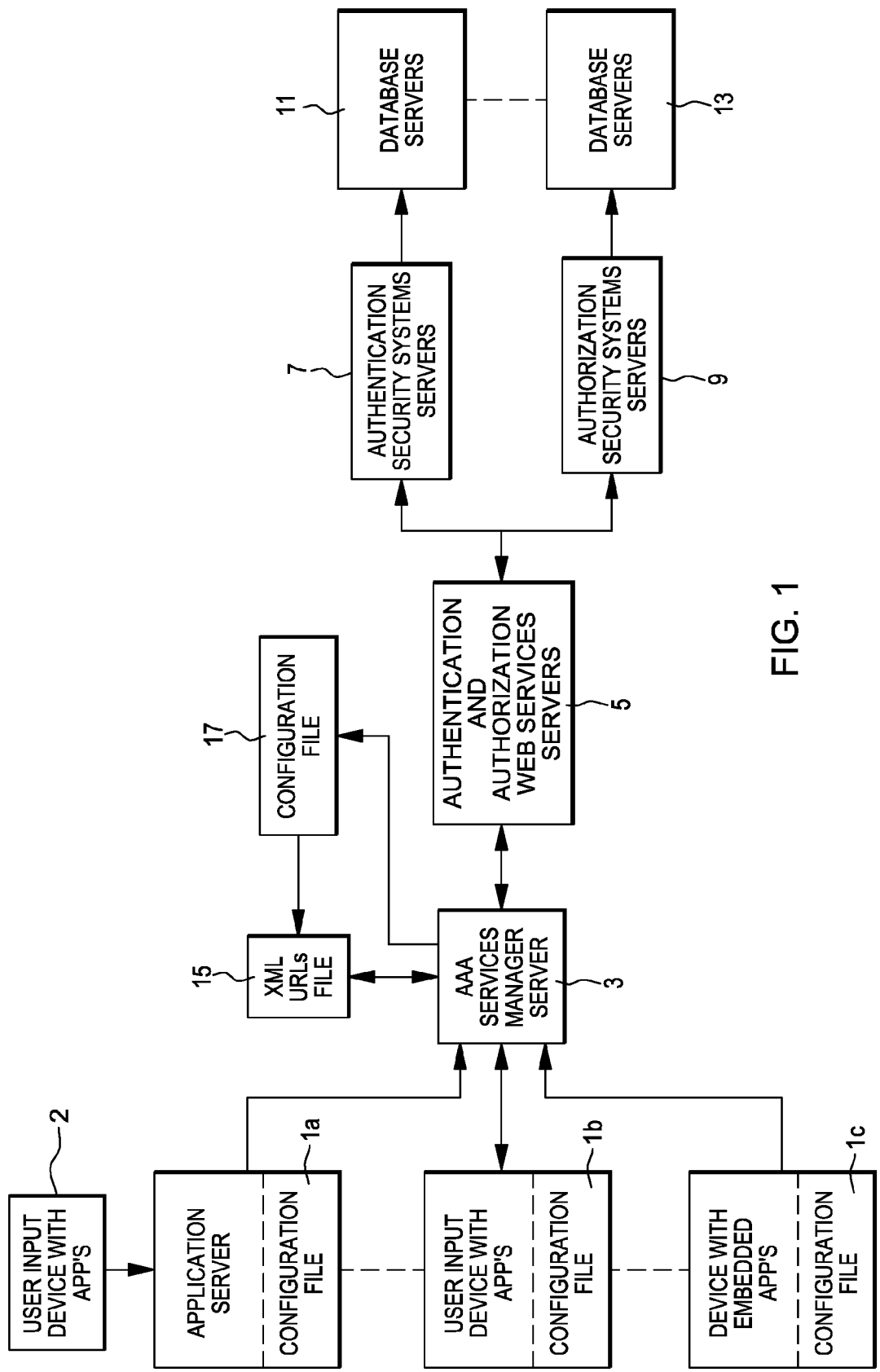
FIG. 1 is an exemplary network arrangement wherein authentication, authorization and auditing are carried out according to an embodiment of the invention.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit", "module" or "system". Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (EPROM) or Flash memory, an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electromagnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc. or any suitable combination of the foregoing. Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks. The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

Figure 2:
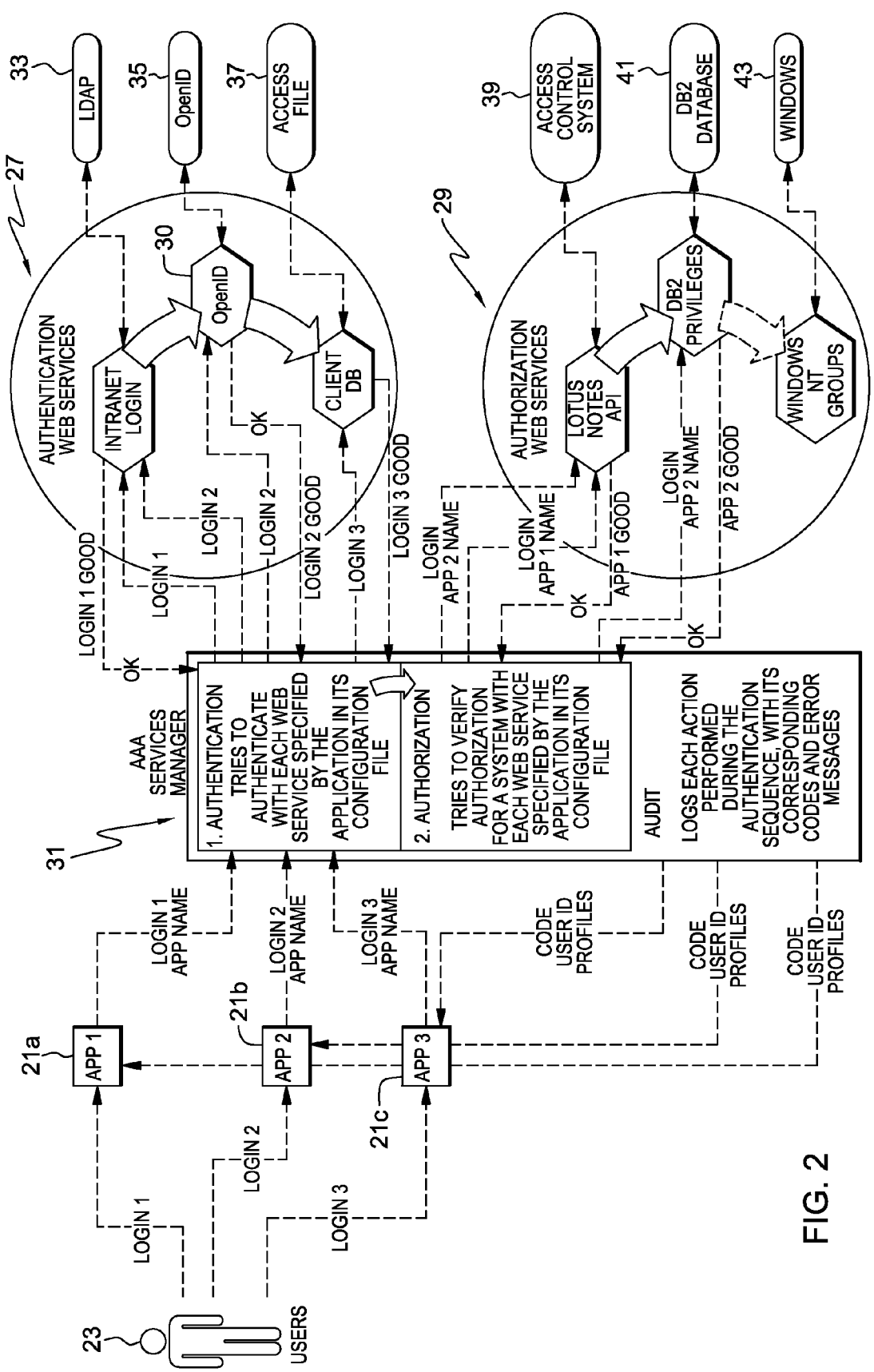
FIGS. 2, 2A and 2B show block diagrams depicting how the invention includes a set of cooperating components interacting to carry out embodiments of the invention.
Figure 3:
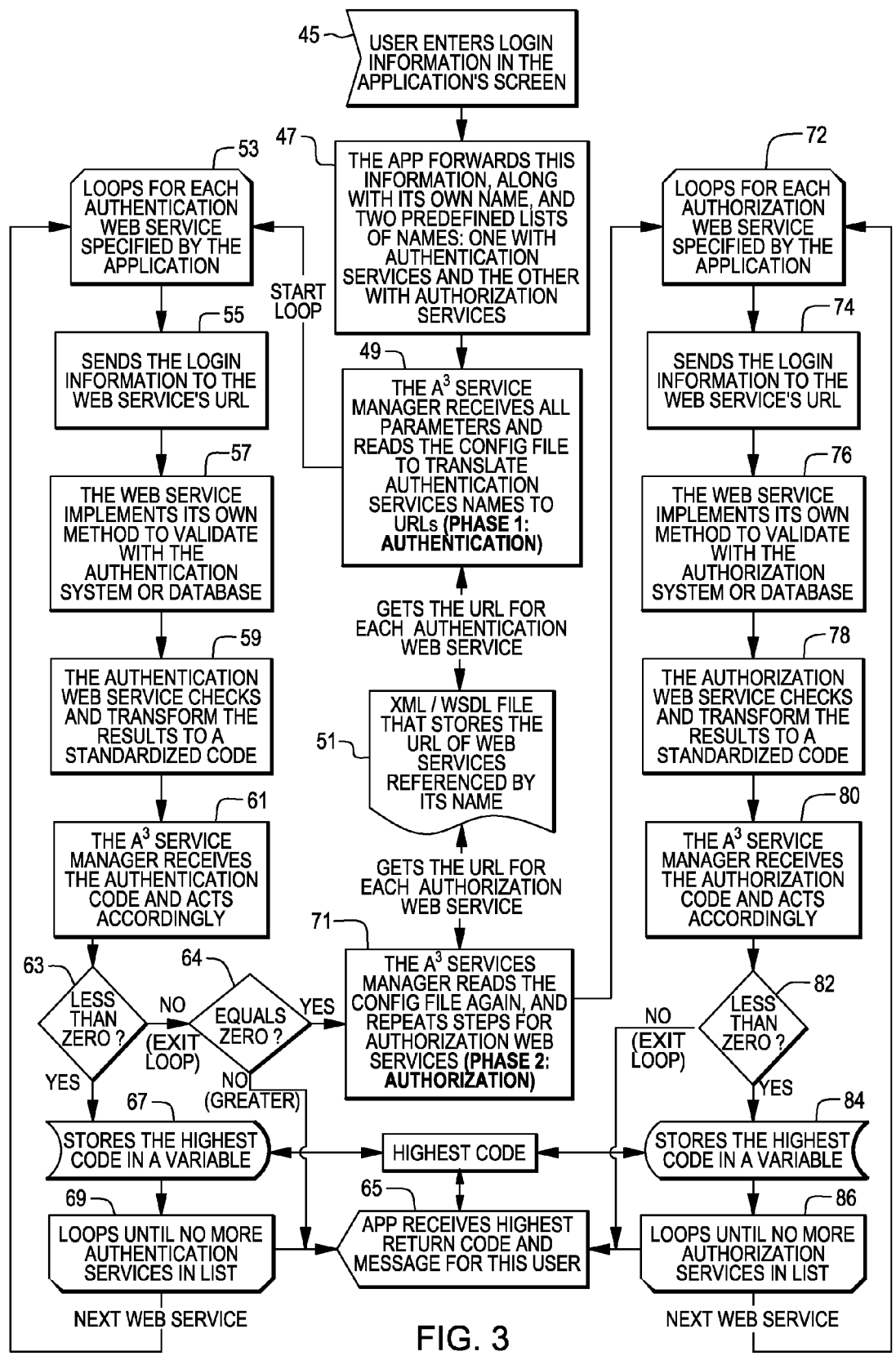
FIGS. 3 and 3A are flowcharts depicting the manner in which authentication, authorization and auditing are carried out in accordance with embodiments of the invention.

The flowchart and block diagrams in the FIGS. 1-3 illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

Referring now more particularly to the embodiment of FIG. 1, there is shown a network system arrangement with a plurality of User Input Devices shown as 1a-1c although any number of User Input Devices may be present. The User Input Devices may be a simple input terminal to enter the necessary information to initiate the process for service, in accordance with an embodiment of the invention, or client devices which download dynamically or hold code locally used to authenticate itself as my be run in a browser, for example. In this regard, a User may be any application, process, device circuit, program, person or any other entity that requires authentication. As shown at 1c, the User is an application, such as a mobile positioning utility, embedded in a device. User Input Device 2 merely interacts with the application server and the configuration file is at the server.

FIG. 1 further shows a Block 3, designated AAA Services Manager Server, representing a server computer that manages the authentication, authorization and auditing (AAA) service processes, in accordance with an embodiment of the invention. The term "server" as used hereinafter is the same as "server computer" and includes a computer program running a service on a computer to serve the requests of other entities, such as, server Applications, clients or User terminal devices which may or may not be running on the same computer. The servers herein may also comprise a computer linked to other computers or servers in a network to carry out its AAA Services Manager processes, as well as other described services. Thus, the AAA Services Manager processes of Block 3 may be a program or programs running as a service on a computer server, to serve the request of other programs on the application servers or User Input Terminals running on the same computer or be independent thereof, in accordance with embodiments of the invention. An Application may be defined here as a program or solution that receives input data and/or provides services to Users, implementing a security module based upon queries to the AAA Services Manager.

Alternatively, the AAA Services Manager processes may be run on the Authentication and Authorization Web Services Server shown at Block 5, in accordance with an embodiment of the invention. The Services Manager processes are shown as running on a server for purposes of better understanding the separate functions being carried out in the invention. Thus, the AAA Services Manager processes may also be run on other computers such as, for example, on the same server as the Application. Similarly, the Authentication and Authorization Web Services processes of Block 5 may be carried out on the same server as the Application. The AAA Services Manager is the main Web service that responds to a User the result of validating the identity and authorized access of the User through queries to the various Web Services at Block 5 in a preferred sequence. Web Services are independent parts of the framework, developed with the ability to speak with its corresponding Security System.

Block 15 represents the XML file of URLs used by AAA Services Manager Server 3 to identify the Web addresses of Authentication and Authorization Web Services on servers represented in Block 5. Respective Security System lists of User Authentication Services and User Authorization Services by name, are configured in accordance with the User Input Devices Configuration File, shown within blocks 1a-1. These lists may be sent to AAA Services Manager Server 3 as parameters and upon receipt are used to match corresponding Web URL addresses in File 15 to create a User Authentication Web address list and a User Authorization Web address list. Alternatively, the lists may be sent or otherwise provided to the AAA Services Manager as files or stored in Configuration File 17 for the matching of corresponding Web URL address in File 15.

Authentication Security Systems Servers 7 and Authorization Security Systems Servers 9 are shown as providing the security services for authenticating and authorizing User access to the various User services provided by Application, Database and Network Servers 11 and 13. In this regard the authentication and authorization processes of servers 7 and 9 are shown as being carried out on servers for purpose of better understanding their separate function but may also be carried out on the various Application Servers 11 and 13. It is clear that servers 7 and 9 and servers 11 and 13 may be any number of a plurality of servers.

Similarly, in accordance with an embodiment of the invention, the processes of the Authentication and Authorization Web Services Servers of Block 5, with or without the AAA Services Manager process of Block 3, may run on Authentication and Authorization Servers 7 and 9. Moreover, some or all of the above processes may be run on servers, such as Servers 11 and 13, in accordance with an embodiment of the invention.

Database Servers 11 and 13 provide database, file or any other datasource access capable of being queried or read by a computer program, and may be one or more computers linked in a network of servers to provide this functionality. The information provided is queried by Security Systems, be this systems running on Servers 7 and 9, or inside the same Servers 11 and 13.

FIG. 2 shows a functional block diagram depicting how the network system components interact in carrying out the processes of an embodiment of the invention. APP Blocks 21a-21c represent an Applications requesting authentication and authorization. Users 23 are shown as individual but, could be some other entity, such as some form of machine requiring a service.

The APPs 21a-21c forward login credentials, such as username and password, and adds their own Application name. The login, as described here, includes username but could be otherwise. Thus, "username" as used herein is intended to mean any form of input that identifies the source of the request for access to an Application. It is also intended that the term "Application" include any service available to the User, such as, an application, script, database, network or the like. Whether the Application resides on the User Input Devices or on application servers, only the username and password may be entered. This is done by the User accessing the desired Application's screen wherein the Application presents the login form and sends its own name with the User login information to the AAA Services Manager.

Figure 2A:
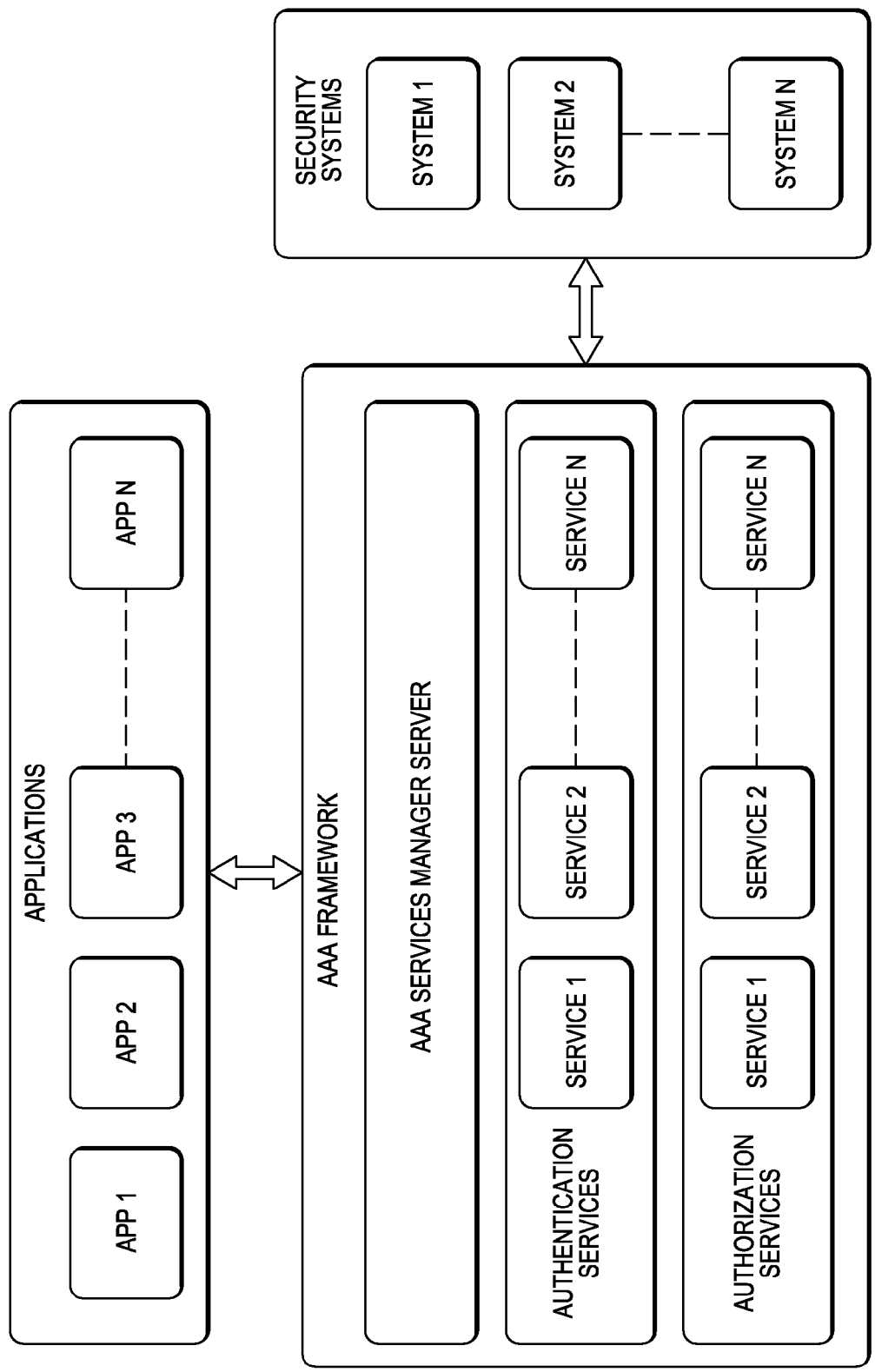

The User Input Devices with an Application program act to configure the list of names of Authentication Services and the list of names of Authorization Services selected by the Application settings. These are predetermined lists created in advance as may be determined, for example, by a user, such as, a programmer, an administrator, designer or other entity. The username, password, Application name and the two lists are forwarded to AAA Service Manager Server, represented by Block 31. This Server acts to carry out the three phases of the access process, i.e. authentication, authorization and auditing phases shown in Sub-blocks 1 and 2, and the block that surrounds them, respectively. FIG. 2A represents the network functional components involved in carrying out authentication and authorization by the AAA Services Manager Server with the arrows showing interactions. The depicted Authentication and Authorization Services 1-N interact with different independent Security Systems 1-N to validate access to different Applications (APPs) 1-N.

Blocks 33, 35 and 37 in FIG. 2 represent the different User Authentication Security Systems used for accessing different Applications. The Authentication Security Systems hold at least a username and password, typically in a database, and act to validate the authenticity of the User that request access to the Application.

Block 33 represents an example of User Authentication Security System utilized in accessing an intranet users directory, such as a corporate directory, where authentication is with e-mail name and password, for example, using LDAP (Lightweight Directory Access Protocol). Block 35 represents an example of internet access protocol that validates against OpenID's trusted identity providers. Block 37 represents an MS Access or any other Database files that may be hosted on various platforms, such as WINDOWS, UNIX or Linux, for example. Each Authentication Security System holds at least a list of usernames and passwords.

Blocks 39, 41 and 43 in FIG. 2 represent Authorization Security Systems for obtaining authorization to one of the three diverse APPs. The Authorization Security Systems hold a list of Application names and User records associated with the Applications that indicate if the User has access to the named Applications, as well as additional information such as User profile, status, level of access, aliases and the like.

Block 39 represents an Access Control System (ACS), such as any of a variety of databases used for authorization. Such System, in addition to knowing the User access level to an Application, manage records as required by an organization. Block 41 represents an example of a Database Management System (DBMS), such as IBM DB2, where its embedded logins and privileges over objects can be used for controlling authorization. Similarly, block 43 shows an Operating System, such as MS WINDOWS, as an Authorization System for authorizing access and linking profiles based on local WINDOWS NT groups and users.

Each of the Authorization and Authentication Web Services is independent of one another and may run on different Web servers such as IIS, Apache, IBM HTTP, etc., and may be programmed in the most appropriate language. For example, to access an intranet ID's Security System, a Java package may be used, and to check logins in a MySQL database, PHP may be more adequate. The particular programming language and logic to query the authentication and authorization Security Systems is encapsulated by the Authentication and Authorization Web Services Blocks 27 and 29. It depends on preferences of the Service's developer and an understanding of the format returned by the specific Security System. Each of the Web Services interacts with only one corresponding Security System. For example, in Block 27 the "Intranet Login" Web Service only interacts with LDAP Security System 33. Similarly, Web Service "OpenID" Block 30 only interacts with "OpenID" Security System 35 and so on. The same interaction exists for Authorization Services 29 where the "Lotus Notes API" only interacts with "Access Control System" 39, and so on.

As shown in FIG. 2, username, password and Application name are initially sent to the Authentication function 1 of AAA Services Manager Server 31. In addition, as previously mentioned, a list of the names of User Authentication Services (sometimes simply called Authentication Services) and User Authorization Services (sometimes simply called Authorization Services) related to the Application may also be configured at the User Input Terminal Device. The lists may be a predetermined selective list of User Authentication Services and User Authorization Services selected by qualified personnel or otherwise related to the Application being requested, or alternatively, may be all of the Services available for authentication and authorization, or none. The User Authentication Services list and User Authorization Services list may be also be configured at the AAA Services Manager Server 31 in response to an Application name or otherwise provided to the AAA Services Manager Server. It is also noted that in situations where authorization is not required, such as when an Application needs only an OpenID verified identity, such authorization list would be unnecessary. The User Authentication Web address list and the User Authorization Web address list are configured by the AAA Services Manager Server 31 by matching by name the entries in the User Authentication Services list and the entries on the User Authorization Services list with corresponding Web addresses in the XML URL's file (Block 15, FIG. 1). This is shown in FIG. 1 where XML URL's file in Block 15 is accessed by AAA Services Manager Server block 3 to match Service's names in lists with Web addresses. The following description is based upon the latter embodiment.

An example of an XML configuration file for Intranet and Internet Services follows:

```
<?"xml version="1.0" encoding="ISO-8859-1?>
<a3>
    <authentication>
        <service name="IntranetLogin">
            https://192.118.81.161/IntranetLogin/
        </service>
        <service name="BigCompanyLogin">
            https://www.BigCompany.com/login/
        </service>
    </authentication>
    <authorization>
        <service name="AuthorizationSystem">
            https://192.18.81.161/CompanySystem/authorization.jsp
        </service>
        <service name="AccessControl">
            https://192.182.83.33:81/AC/access
        </service>
        <service name="SimpleAuthorization">
            https://90.18.83.33:81/SimpleAccess
        </service>
    </authorization>
</a3>
```

A file configured for intranet access only would have to take somewhat different URL formats.

The User Authentication Services list is arranged in the order in which the Systems will be queried for Authentication. As stated above, the AAA Services Manager Server matches the names on the User Authentication Services list as may be received from the User Input Terminal with its own XML/WSDL file where corresponding Authentication Web Services URLs are found. The list of Authentication Web address URL's list is created in the same order as the User Authentication Services list and thus, will be called by the AAA Services Manager Server for Authentication in that order. The AAA Services Manager Server carries out the same process with the User Authorization Services list to create the User Authorization Web address list.

Again, with reference to FIG. 2, the AAA Services Manager Server 31 begins the Authenticating process first by forwarding the username and password to each Web Service specified in the Authentication Web Services list, beginning with the first. Authentication Web Services 27 acts to implement a connection to the destination Authentication Security System as called, passing it the username and password in the appropriate format or scheme of the System. The Authentication System validates the received username and password and responds in its own format or scheme manner. If the Authentication System is any form of datasource, such as databases or flat files, validation can be done by the Service, which queries the datasource directly. Again, communication with each of the Authentication and Authorization Systems is encapsulated through use of Web Services 27 and 29. Authentication and Authorization Security Systems are sometimes called Security Systems, Authentication Systems and Authorization Systems or simply Systems.

As shown in FIG. 2, Login 1 is passed by AAA Services Manager Server 31 to the Intranet Login Authentication Web Service (inside Block 27), which passes username and password to LDAP Authentication System 33. The LDAP Authentication System returns validation in its own format to the Authentication Web Service indicating that Login 1 is good, i.e., Authentication "success" as shown by the return "OK" line. Authentication Web Services, in turn, converts the "success" indication from the LDAP Authentication System into a standard code to return to the AAA Services Manager Server. Where authentication is a "success", the AAA Services Manager Server stops the process as to Login 1.

The following is an example of a standard list of Authentication Codes and Corresponding Messages:

Invalid authentication Service=−5
Invalid login=−4
Invalid credentials=−3
Unknown error=−2
Communication error=−1
Authentication success=0
Password expired=1
Invalid password=2
User locked=3

Again, with reference to FIG. 2, Login 2 to Intranet Login Web Service (inside Block 27) results in some form of failure to authenticate from LDAP Authentication Security System 33. Where such failure results in any of the negative codes in the above list, the AAA Services Manager Server 31 forwards the username and password of Login 2 to OpenID Web Service 30 which, interacting with OpenID Authentication Security System 35, results in a successful authentication, as shown by "Login 2 good" or "success" return arrow. This "success" authentication stops the Login 2 process. Thus, as login accesses fail in a given Authentication Security System for negative codes, the process selects the next User Authentication Web Service on the list, as carried out by AAA Services Manager Server Block 31. Where failure to authenticate is due to a positive code return, the process stops, as is also the case with "0" codes (success). Also shown is Login 3 being OK. It is not shown in the figure, but it is supposed that Login 3 has failed with Intranet Login and OpenID Web Services, as the sequence dictates.

The same process as carried out by the AAA Services Manager Server 31 and Authentication Web Services 27 is carried out for authorization using Authorization Web Services 29. Thus, a second list of User Authorization Services, as embodied in a corresponding authorization Web Services list is called in the order in which the list is created. The process starts with the Authorization function of AAA Services Manager Server 31 sending the username and Application name to the first Web Service of the list. A password need not be sent for carrying out authorization. As shown in FIG. 2, the first Web Service on the list would be ACS Lotus Notes API example in Authorization Web Services Block 29. The ACS Lotus Notes API acts to implement a connection to Access Control System 39 which acts to validate the existence of the Application and verify the User username that is communicated to. If Access Control System 39 finds an entry that matches both username and Application name, access will be granted including the level of access (security groups, processes and controls to which the User has access). In addition, a User ID or an alias to be used in the Application may be provided if different from the username. The Authorization Systems also takes into account the state of the entry, which may be active, expired, pending approval, and so on, in returning information to the Authorization Web Services 29 in its own format. Authorization Web Services 29, in turn, translates the information returned into a standard Code to return to the AAA Services Manager Server 31.

The following codes are examples of Authorization Codes and corresponding Messages.
Invalid authorization Service=−9
Invalid Application=−8
Unknown error=−7
Communication error=−6
Authorization success=0
Pending access=4
Denied access=5

It can be seen from both the Authentication Codes and Authorization Codes that any number of messages may be returned with the validation codes to the AAA Services Manager Server. If the return code is a positive number, the AAA Services Manager Server will stop the process of calling Authentication and Authorization Services from their respective lists, be it Authentication process or Authorization process, and act to return the message corresponding to the appropriate code number to the Application.

If the returned Authentication code number is negative, the User's membership to the System cannot be determined, so the next Authentication Service on the list will be called. Such is the case whether it be for the Authentication process or the Authorization process, as the case may be. As long as negative code numbers are returned, the process loops to the next entry on the list until the complete list is called.

In either the Authentication process or Authorization process, if a neutral code (0) is received by the AAA Services Manager Server, it indicates "success". For the authorization process, the return of neutral code information, indicating a match of the Application and username in the particular Authorization System, causes information such as to the level of access and other access data to be maintained in the Application to manage the user's profile.

As each of the Authentication process and Authorization process acts to loop to sequence the list, as a result of the return of a negative code, the AAA Services Manager Server stores the negative numbers, replacing the previously stored number with when the returned number is bigger, i.e. less negative. This provides a priority scheme which may finally indicate to the User at the end of sequence, the most relevant information.

For example, if the authentication return code is "Invalid login" (−4) and another authentication return code is "Communication error" (−1), it is preferable to inform the User that there is a communication problem rather than that the User couldn't validate. This informs the User of the opportunity to retry once the communication error is fixed.

Similarly, if an Authentication return code is "Invalid Authentication Service (−5) and another authentication return is "Invalid credentials" (−3), it is better to inform the User that the credentials (username and password) entered are not valid, because it means that although the previous authentication Service in the sequence was not found as valid, there was a match in at least one of the following Services. In like manner, if an Authorization return code is "Invalid System" (−8) and another authorization return code is "Unknown error" (−7), it is better to inform the User that there is an unknown error. Negative codes are only reported to the Application, whether Authentication process or Authorization process, when the last entry in the list has been tried. The largest stored code number is reported to the Application with corresponding message. The Application then can inform that message to the User, or can choose a more appropriate one depending on the context (i.e. User country or language) according to the code number.

A neutral (0) Authentication code indicating "success" acts to initiate the Authorization process, and for both the Authentication process and Authorization process, the "success" code and message is sent to the Application. In most instances this "success" message need not be sent to the User by the Application.

Positive codes stop both the Authentication process and Authorization process. Positive codes indicate some form of error but the existence of a User or Application, or database, etc. has been proven so the sequence does not continue as it has found the right System. The User is sent any one of messages that the "Password expired", "Invalid password" or "User locked" for the Authentication process, and "Pending Access" or "Denied access" for the Authorization process. Other similar types of helpful messages may also be used to support the fact that the existence of a User or Application or database, etc. has been proven but access at this time cannot be granted. The User then must take further action to obtain access.

The AAA Services Manager Server 31 shown in FIG. 2 may also act to perform an Auditing function running parallel to the Authentication process and Authorization process. Such function may act to record all validation attempts, time and date, and their results including other information as to the status and authority of the User and Applications accessed. An example of such auditing function will be described with reference to FIGS. 2B and 3A.

With reference to FIG. 3, there is shown a flowchart of a process for carrying out an embodiment of the invention. The process starts at Blocks 45 and 47 where an APP, shown in FIGS. 1 and 2, forwards to the AAA Services Manager Server the username, password, Application name and two predefined lists of names in a configuration file, one for Authentication Services and the other for Authorization Services. Alternatively, Login with only the username and password may be sent to the AAA Services Manager Server where only authentication is required. The AAA Services Manager Server initially reads the XML/WSDL configuration file with Authentication Services names and URLs at Block 49 to translate the names to the URLs of the corresponding Web Services for authentication and creates a list in memory in the same order as predefined. This configuration file is shown at Block 51. The same is done for Authorization Web Services in Blocks 71 and 51.

The AAA Services Manager Server then begins calling the list of Authentication Web Services, as ordered on the list, to initiate the loop for each Authentication Web Service specified, as shown at Block 49. For the authentication process, the AAA Services Manager Server sends the username and password, as shown at Block 55. The Web Service implements its own methods to check the username and password, in the appropriate language and format, with the Authentication System.

As shown at Block 55, the AAA Services Manager Server sends the username and password information to the Authentication Web Service's URL and the Web Service implements its own method to validate with the Authentication System or database, as shown at Block 57. As shown at block 59, the Authentication Web Service gets the result from the Authentication System or database in the latter's language and format, and transforms it into a standardized Authentication Code, such as given above.

The AAA Services Manager Server receives the particular Authentication Code as shown in Block 61 and acts according to whether the code is negative, positive or neutral. This determination is first made at Block 63 where a query is made as to whether the code is "Less than 0". If not less than zero, a determination is made at Block 64 of whether the code "equals 0". If it is not, the Authentication process determines at Block 64 that this Authorization Code is greater than zero. So, the process moves to retrieve this code as the highest Authentication return code at Block 65 and reports this highest code and corresponding message to the Application.

Where it is determined at Block 63 that the Authentication Code is "less than zero", the AAA Services Manager Server stores the highest code in a variable, as shown at the step of Block 67, and loops back at Block 69 to the next Authentication Web Service on the list, as shown at Block 53. The loop initiated at Block 53 and delimited by Block 69 continues until there are no more Authentication Services on the list.

Where the Authentication Code is determined at Block 64 to be Equal to zero, the AAA Services Manager reads the XML/WSDL configuration file (Block 51) with Authorization Services names and URLs at Block 71, to translate the names to the URL's of the corresponding Web Services for authorization, and creates a list in memory in the same order as predefined. The AAA Services Manager then starts the loop for each Authorization Web Service specified, as shown at Block 72.

Authorization steps 74, 76, 78 and 80 are the same steps as taken for Authentication. It is clear that, depending upon Code responses received from the Authentication and Authorization Web Services, either loop, whether Authentication or Authorization, may stop at any point on the list.

Thus, as shown at Block 82, where the Authorization Code returned to the AAA Services Manager Server is not "less than 0", the process exists the loop and retrieves, at Block 65, the highest Authorization return Code and reports this highest Code and message to the Application.

Where Authorization Code is "less than 0", the AAA Services Manager Server stores the highest code in a variable, as shown by the step at Block 84 and, as shown by the step of Block 86, loops back until there are no more Authorization Web Services on the list.

Figure 2B:
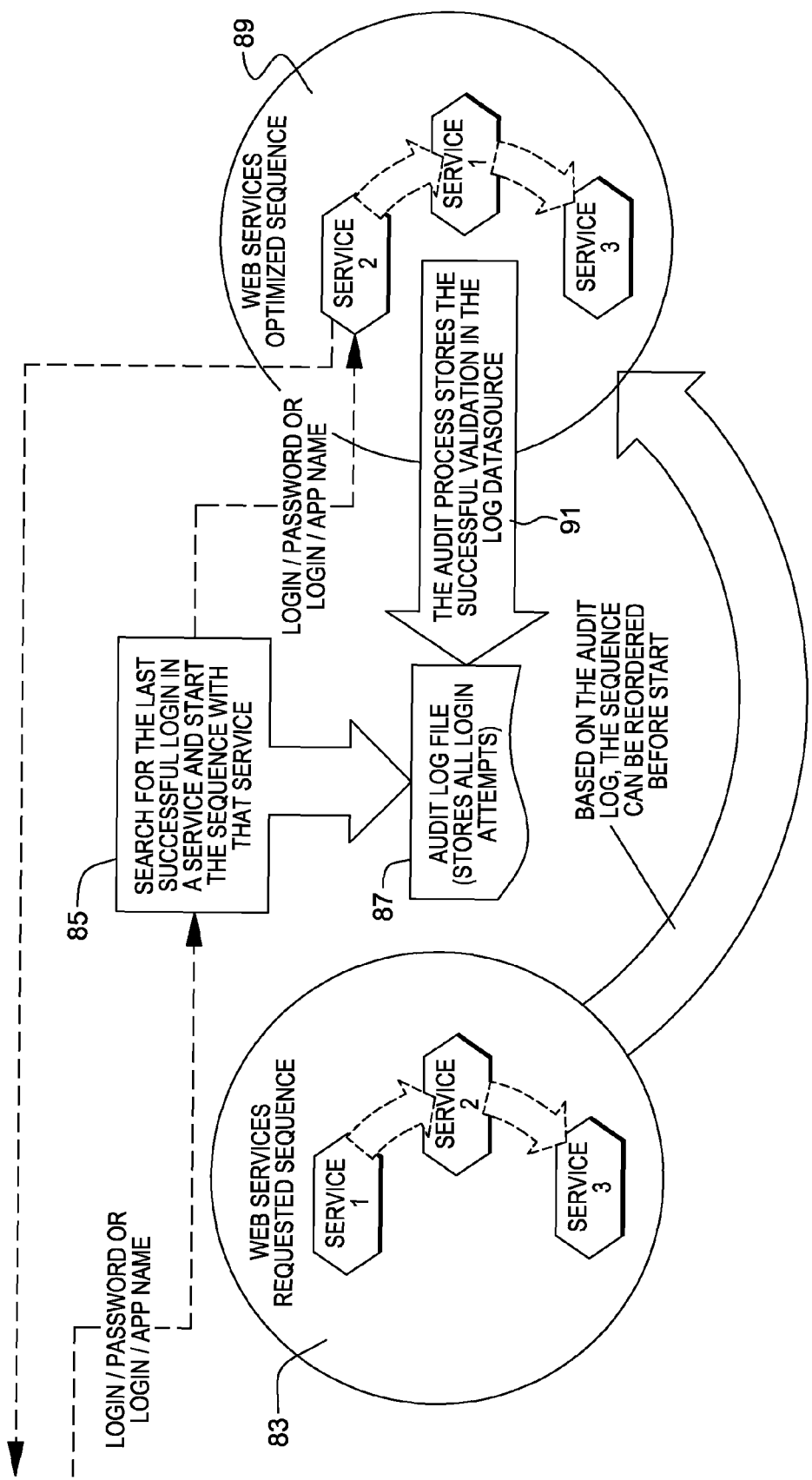

FIG. 2B shows an overall block diagram depicting how the invention includes cooperating components interacting to carry out an embodiment of the invention relating to Auditing.

For Auditing of the Authentication process, the Login (username and password) is sent to the AAA Services Manager Server with the requested sequence of names of the Authentication Services which provide the basis for the requested Web Services Sequence shown in Block 83 for authentication. Queries are made at Block 85 of Audit Log File 87 for the last successful login in a service, if any. If none, the requested sequence is used. If a successful Service name is on the requested sequence of names of the User Authentication Services in Block 83 and the successful Service name is not first on the list, the AAA Services Manager creates a Web Services optimized sequence as shown at Block 89, whereby the sequence is reordered with successful Service name positioned first on the list. In the example shown, Service 2 is reordered to first position in the sequence. The recorded list is used for creating the Web Services URL's. When the sequence is executed the Audit process of the AAA Services Manager Server stores, among other things, the successful validation in the Log datasource file, as shown at Block 91.

For the Authorization process, the AAA Services Manager Server receives the username and Application name along with the requested sequence of the names of Authorization Services which provide the basis for the requested Web Services sequence for authorization. The remainder of the Authorization Auditing process is the same as the Authentication Auditing process.

Figure 3A:
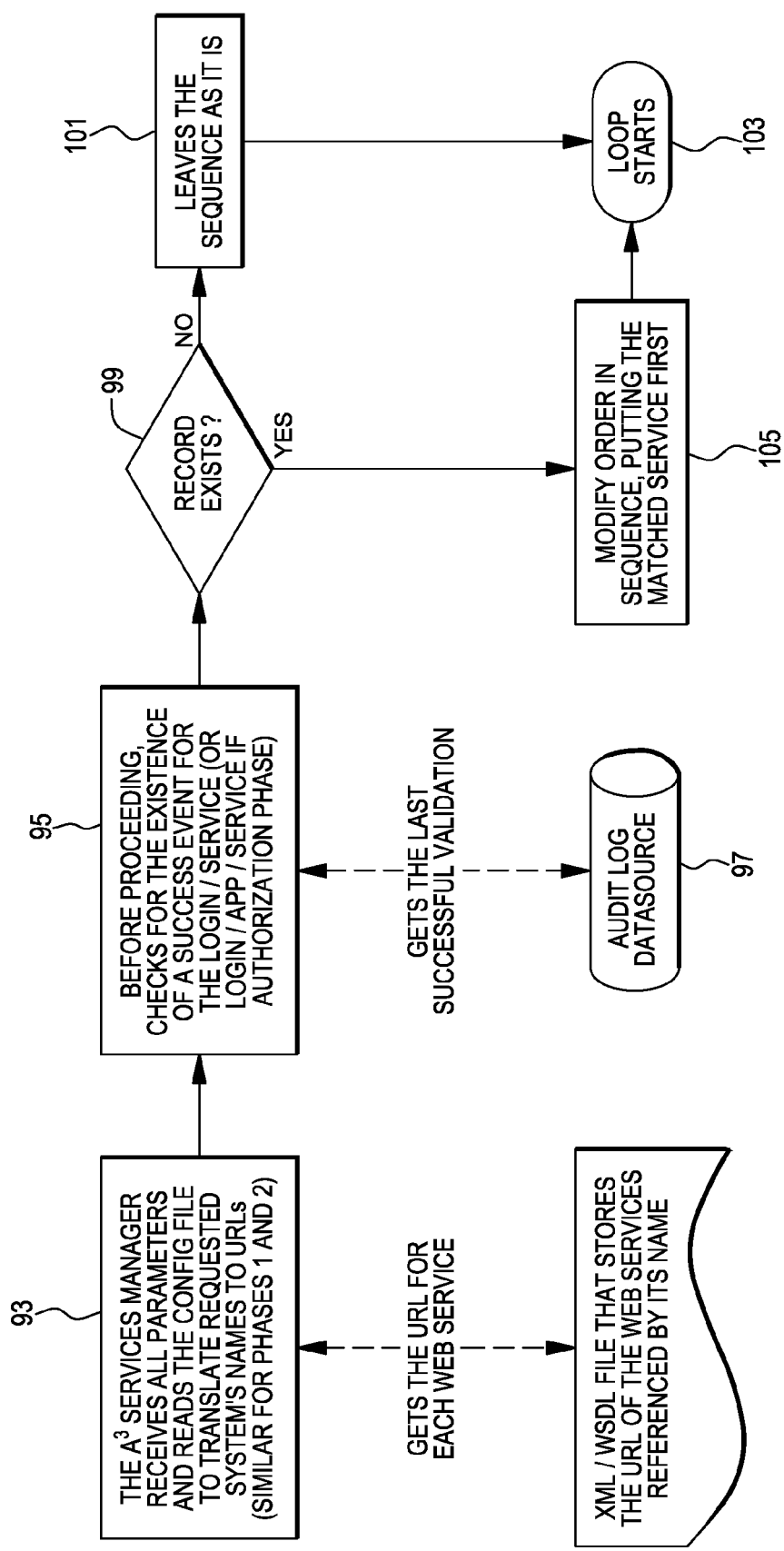

FIG. 3A shows a flowchart of the manner in which part of the Auditing function, depicted in FIG. 2B, is carried out by the AAA Services Manager. As shown at Block 93, the AAA Services Manager receives all of the Authentication parameters from the input process, as previously described, and reads the configuration file list of Authentication Services names and translates the list of names into corresponding URLs as described in Blocks 47, 49 and 51 in FIG. 3.

As shown by Block 95 in FIG. 3A, before initiating the Authentication loop (Block 53 of FIG. 3), the AAA Services Manager checks Audit Log datasource 97 for the existence of a successful Login in an Authentication Service. If there are no successful Logins for a Service that appears on the requested sequence of Authentication Services, as determined at Block 99, the process proceeds to Block 53 in FIG. 3, leaving the requested sequence as it is (Block 101). As shown in Block 103 in FIG. 3A, the loop of Block 53 in FIG. 3 starts with the requested sequence of Authentication Services names.

Where, on the other hand, a successful Login for a Service on the requested sequence of Authentication Services names is found at Block 99, the Web list sequence of URLs of Authentication Services names is reordered, as shown at Block 105, with the successful Login Service reordered to the first position on the Web list of Authentication Services. This reordered list is then used to start the loop at Block 103.

It is to be understood that the same process is used for the Authorization process. The AAA Services Manager searches the Audit Log datasource for successful username in a User Authorization System for a requested Application name. If one is found, the Web list of Authorization Services is reordered accordingly. As is clear, the Auditing in both the authentication process and authorization process are carried out in parallel with these processes.

In accordance with the present invention, it can be seen that one feature of serialization is, for example, that responsibility for authentication and/or access may be distributed through the ability to prioritize Security Systems. Thus, for example, where there is an Application that will be accessed by a large number of Intranet Users that have Intranet access and a smaller number of Application Users that do not have Intranet access, the serialization of authentication, for example, may be arranged so that access is first attempted for Intranet access, using an Intranet User Security System, leaving the smaller number of Application Users in a second attempt to authenticate against, for example, a local database or another pre-existing Security System.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence of addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiments were chosen and described in order to best explain the principles of the invention and the practical application, and to enable others of ordinary skill in the art to understand the invention for various embodiments with various modifications as are suited to the particular use contemplated.

What is claimed is:

1. A method of authenticating and authorizing access to Applications in different systems on networked server computers, comprising:
    providing user access credentials and an Application name for user access to an application;
    providing an authentication list of authentication Services associated with the application name in an order in which they are to be called for authentication;
    creating an authentication Web address list of Web addresses with the Web addresses on said authentication Web address list corresponding to respective Web addresses of the authentication Services on the authentication list in the same order as the authentication list;
    sequentially sending for authentication the User access credentials to each of the Web addresses on said authentication Web address list in the order in which they are listed to initiate interfacing access with respective user authentication Security Systems for access to a user application until the User access credentials are accepted by an authentication Security System, the User access credentials are recognized but found ineligible for present authentication or the authentication Web access list is completed to thereby complete the authentication process; and
    receiving at said authentication Services results from the authentication Security System as they are sequentially sent from the authentication Web address list and creating standard coded responses indicative of the type of response received.

2. The method as set forth in claim 1 including the steps of:
    providing an authorization list of the user authorization Services associated with the application name in the order in which they will be called for authorization;
    creating an authorization Web address list of the Web addresses with the Web addresses on said authorization Web address list corresponding to respective Web addresses of the authorization Services on the authorization list in the same order as the authorization list; and
    upon completion of the authentication process step, sequentially sending for authorization the User access credentials and Application name to each of the Web addresses on the authorization Web address list in the order in which they are listed to initiate interfacing access with respective authorization Security Systems until the User access credentials and Application name are accepted for access by an authorization Security System, access is denied or invalid, or the authorization Web address list is completed.

3. The method as set forth in claim 2 wherein the User access credentials and Application name are communicated to the Web addresses of the authentication Web address list and the Web addresses of the authorization Web address list to initiate, when called, interfacing with a programming language used by the respective authentication Security System and authorization Security System.

4. The method as set forth in claim 3 wherein the authentication list and the authorization list are created by user input terminals and the authentication Web address list and authorization Web address list are created by an authentication and authorization Services Manager Server from the authentication list and authorization list as received from the input terminals.

5. The method as set forth in claim 4 wherein entries on the authentication list and authorization list may vary from 1 to N in number, where N is any number.

6. A method for authenticating and authorizing access to Applications in different user systems on networked server computers, comprising:
    receiving a username, password and an Application name;
    providing a predefined authentication list of user authentication Services in the order in which they are to be called for authentication;
    providing a predefined authorization list of the user authorization Services in the order in which they will be called for authorization;
    creating an authentication Web address list of the Web addresses corresponding to each authentication Service on the authentication list in the same order as the authentication list;
    creating an authorization Web address list of the Web addresses corresponding to each of the authorization Services on the authorization list in the same order as the authorization list;
    sequentially sending the username and password to each of the Web addresses on said authentication Web address list in the order in which they are listed to initiate interfacing user access and responses from authentication Systems indicating that the user name and password is accepted for access, the authentication list is completed or the User password is recognized but found invalid, expired, locked or otherwise ineligible for present authentication;
    when a password is accepted by an authentication System, sequentially sending the username and Application name to the Web addresses on the authorization Web address list in the order in which they are listed to initiate interfacing user access and responses from authorization Systems indicating that the user name and Application name are accepted for access, the username and Application name are found in an entry but the access is denied, expired, pending approval or other status that differs from granting access, or the authorization list is completed; and
    translating responses from the authentication Systems and authorization Systems into a standard coded responses indicative of the type of response.

7. A computer program product for authenticating and authorizing access to Applications in different user systems on networked server computers, comprising:
    a non-transitory computer readable storage medium having computer usable program code embodied therewith, the computer usable program code comprising:
    computer readable program code configured to process username, password, an Application name, an authentication list with the names of respective ones of a plurality of authentication Services of authentication Security Systems and an authorization list with names of respective ones of a plurality of authorization Services of authorization Security Systems;

computer readable program code configured to create an authentication Web address list of the Web addresses corresponding to each of the authentication Services on the authentication list in the same order as the authentication list;

computer readable program code configured to create an authorization Web address list of the Web addresses corresponding to each of the authorization Services on the authorization list;

computer readable program code configured to sequentially send the username and password to each of the Web addresses on the authentication Web address list in the order in which they are listed to initiate interfacing User access to and responses from the authentication Security Systems indicating that the username and password is accepted for access, the authentication list is completed or the User password is recognized but found invalid, expired, locked or otherwise ineligible for present authentication;

computer readable program code configured so that when a password is accepted by an authentication Security System, the program code acts to sequentially send the username and Application name to each of the Web addresses on the authorization Web address list in the order in which they are listed to initiate interfacing User access to and responses from the authorization Security Systems indicating that the username and Application name are accepted for access, the authorization list is completed or the username and Application name are matched but access is denied, invalid or has a status that otherwise will not grant access at the time of the access attempt; and computer usable program code configured to translate the responses from the authentication Security Systems and authorization Security Systems into standard coded responses indicative of the type of response.

8. The computer readable storage medium as set forth in claim 7 including computer readable program code configured to communicate the username and password to the Web addresses corresponding to the user authentication Services and username and Application name to the Web addresses corresponding to the authorization Services to initiate interfacing with the programming language used by their respective Security Systems.

9. The computer readable storage medium as set forth in claim 8 including computer readable program code configured to receive the authentication list and the authorization list as created by user input terminals and create the authentication Web address list and authorization Web address list from the received authentication list and authorization list.

10. The computer readable storage medium as set forth in claim 9 wherein computer readable program code is configured to create the authentication list and authorization list at a server.

11. A system for authenticating and authorizing access to different user Applications on networked server computers, comprising:

client devices for initiating access to an Application on networked server computers hosting a plurality of available user Applications, accessible through validation with different user authentication Systems and different user authorization Systems, by using Application name, username and password;

authentication and authorization Web Services servers having access to different user authentication Security Systems and different authorization Security Systems and with the authentication and authorization Web Services servers arranged to initiate access to the different Security Systems when called by interfacing with the different authentication Security Systems and different authorization Security Systems according to the respective programming language employed by each of the respective authentication Security Systems and authorization Security Systems in response to a request for User access; and an authentication and authorization Services Manager server arranged to process a username, password, Application name, a predefined authentication list of authentication Services and a predefined authorization list of authorization Services for User access to the networked server computers and translate the authentication list of authentication Services and the authorization list of authorization Services into a corresponding authentication Web address list and a corresponding authorization Web address list in the same order as the authentication list and authorization list with each list providing the sequential order in which the list entries will be called to initiate access to the different Security Systems, initially by said authentication Web Services servers from the authentication Web address list for authentication with the username and password, and in response to receipt of authentication return messages from user authentication Security System, as called by said authorization Web Services servers from the authorization Web address list for authorization with username and Application name for receipt of authorization return messages from the authorization Security System, said authentication and authorization return messages, as they are received by the authentication and authorization Web Services servers from the authentication Security Systems and authorization Security Systems, act to initiate standard coded responses to send to the authentication and authorization Services Manager server indicative of the type of response received.

12. The system as set forth in claim 11 wherein the entries on said authentication list and authorization list may vary in number from 1 to N, where N is any number.

13. The system as set forth in claim 11 wherein said client devices provide the predefined authentication list and the predefined authorization list with each list arranged in a sequence in the order in which they are to be called by the Web authentication and authorization Services Manager servers.

14. The system as set forth in claim 13 wherein the authentication and authorization Services Manager server responds to the Application name to provide the predetermined authentication list and the predetermined authorization list with each list arranged in a sequence in the order in which they are to be called.

15. The system as set forth in claim 11 wherein when a standard coded response sent to the authentication and authorization Services Manager server from the authentication and authorization Web Services servers indicates a negative response so that the User can not have access, the authentication and authorization Services Manager server acts to call the next Web address on the Web address list.

16. The system as set forth in claim 15 wherein when the standard coded response sent to the authentication and authorization Services Manager server from the authentication and authorization Web Services servers indicates a positive response so that the User may have access but cannot access now, a response is sent by the authentication and authorization Services Manager server and the process ends.

17. The system as set forth in claim 16 wherein when the standard coded response sent to the authentication and authorization Services Manager server from the authentication and authorization Web Services servers include a standard neutral response that indicates success, the authentication and authorization Services Manager server begins calling the authorization Web address list when in authentication phase, or returns the success code and message to the Application when in authorization phase.

\* \* \* \* \*